Patented Mar. 9, 1948

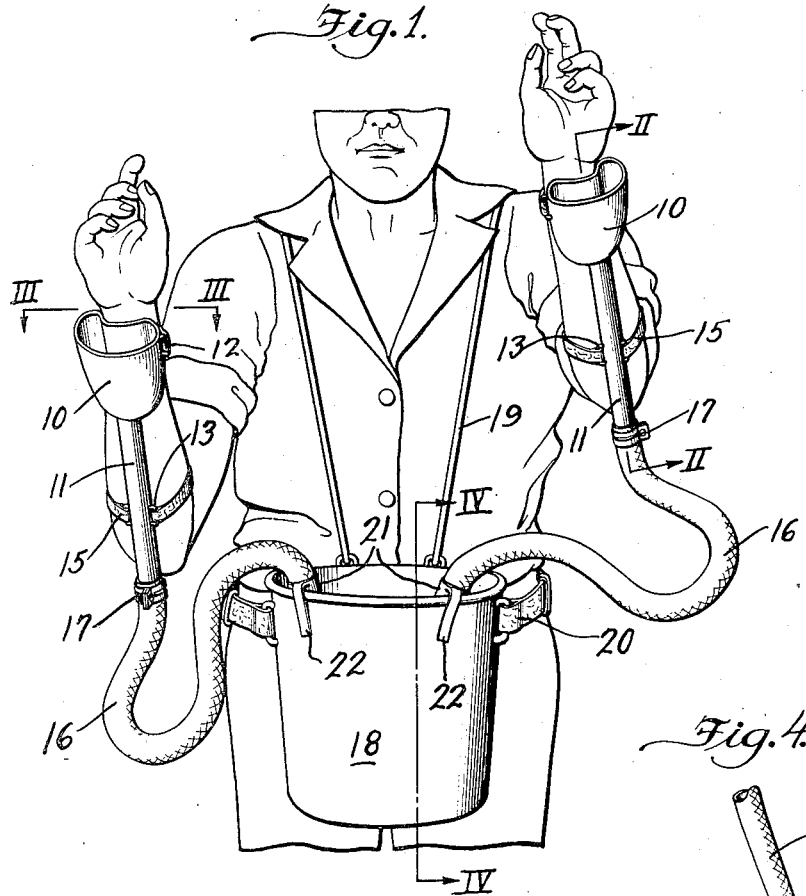
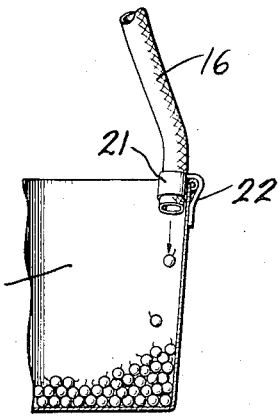
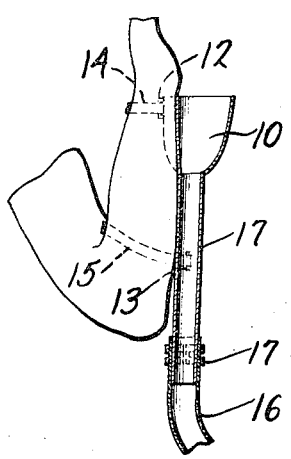
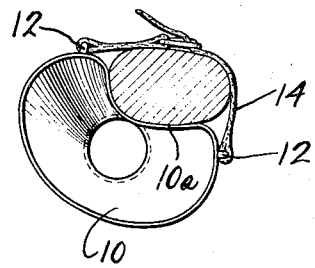

2,437,461

UNITED STATES PATENT OFFICE 2,437,461

DEVICE FOR CONVEYING PICKED FRUIT FROM THE HAND TO A REMOTE RECEPTACLE

Russell E. Faulkner, Chicago, Ill.

Application May 23, 1945, Serial No. 595,317

1 Claim. (Cl. 193—7)

This invention relates to a device for conveying picked fruit from the hand to a remote receptacle. In the picking of small fruit such as cherries the individual pieces are gripped by the fingers of the picker and pulled from the stems by a relatively small movement of the hand and arm. The continuity of this operation is limited however by the number of pieces of fruit which may be retained in the hand or hands of the operator while still continuing with the removal of fruit from the stems. When the hands are full it is necessary for the picker to make a considerable movement of his hands and arms in order to transfer their contents to a receptacle such as a pail or basket which is ordinarily carried at a point near the waist of the operator, being suspended either from a belt or from a special harness provided for such purpose.

Since in the picking of cherries and other small fruit which grow on trees the hands of the operator are ordinarily in an elevated position well above his waistline, ordinary movement of the hands in transferring picked fruit to the receptacle is in a downward direction. It is not practicable to throw or violently drop the fruit from any great distance into this receptacle since such procedure bruises and damages the fruit thus causing it to rot or spoil in shipment.

It is therefore an important object of this invention to provide a device which may be attached to the hand of the operator into which fruit pulled from stems by the fingers of the operator may be naturally dropped, said device including a conveyor conduit leading to the pail or other receptacle. Since the conveyor or other conduit is necessarily of a flexible material, flexure of this material and normal curves therein will prevent too violent dropping of the fruit into the receptacle and consequently obviate damage thereto.

A further object of the invention resides in the provision of a device of the kind described which is light in weight, which may be readily attached to the hand and arm of the operator, and which embodies a relatively rigid portion extending along the forearm of the operator coupled to a flexible portion of conduit or tubular form for conveying the fruit from said relatively rigid portion to the receptacle ordinarily carried adjacent the waist of the operator.

It is a further object of this invention to provide a device of the kind described which is of simple and durable construction, which is easily attached to the hand and arm of the operator, and which is light in weight so as not to fatigue the operator unduly when it is used.

Other and further important objects of the present invention will be apparent from the disclosures in the specification and the accompanying drawings, as well as from a description of a preferred embodiment of the invention which is hereinafter set forth.

The invention (in a preferred form) is shown on the drawings and hereinafter more fully described.

On the drawings:

Figure 1 is a fragmentary front elevational view showing devices embodying the principles of the present invention positioned for use and showing the relative relation of such devices with the hands and arms of the operator to a receptacle for the picked fruit.

Figure 2 is a section on the line II—II of Fig. 1 with parts shown in elevation.

Figure 3 is a slightly enlarged view taken along the line III—III of Fig. 1 showing relation of the initial receptacle or receiving hopper to the wrist of the operator.

Figure 4 is a fragmentary section on the line IV—IV of Fig. 1.

As shown on the drawings:

The receiving and conveying devices of the present invention while shown applied to each arm of the operator or picker are identical in construction so that only one thereof need be described. Such devices comprise a primary receptacle or cup 10 which is of hopper-like form and which is contoured along one side as at 10a to closely fit the wrist of the picker adjacent the base of the hand. This hopper-like portion 10 has its bottom in open communication with a relatively rigid tubular member 11 which may be integral therewith and which provides a conduit through which articles of fruit dropped from the hand of the operator into the hopper may be conveyed downwardly under the influence of gravity. The members 10 and 11 are provided with swivel loops 12 and 13, respectively, to which attaching straps 14 and 15 are secured for adjustably fastening the hopper 10 and the tube 11 to the wrist. (See Fig. 3 for arrangement of securing straps.)

The relatively rigid conduit or conveyor members 11 have flexible conveyor members 16 of tubular form secured to their lower ends as by clamps 17 so as to provide an unobstructed passage from the interior of said members 11 to the interior of said members 16. As will be noted from Fig. 1 the tubular conveyor members 16 are sufficiently flexible so as to permit of ready movement of the hands and arms of the operator in an upward or downward direction and when a quantity of fruit is collected within the interior of the members 11 and the members 16 it is only necessary for the operator to raise his hand or arm to an elevated position to permit the transfer of that fruit under the influence of gravity into a usual pail or final receptacle 18 which in the present instance is shown as carried on the body of the operator or picker by harness devices 19 and 20. The flexible conveyor members 16 are provided adjacent their lower ends with ferrules 21 to which are attached clip-like clamping members 22 so that the edge of the receptacle 18 may be engaged between the outer face of said ferrules and the inner surfaces of said clip-like members to secure the lower ends of the flexible members 16 to the rim of the receptacle 18. Figure 4 illustrates the manner in which picked fruit is dropped from the open lower ends of the flexible conveyor 16 into the receptacle 18.

The hopper or primary receptacle members 10 and the relatively rigid conduits 11 associated therewith are preferably made of aluminum alloy or some light and relatively rigid material which is durable and which will not be damaged by the fruit or by ordinary movements of the hands and arms of the operator during the picking operation. It is possible that these members might be made of a suitable molded plastic material.

The flexible conduit members 16 may be made of any suitable material and may conveniently be in the form of a combined fabric and rubber hose or of any other suitable composition which will be sufficiently flexible and which will be self-sustaining in the retention of its tubular form.

In the use of the device embodying this invention cherries or similar fruit are pulled from the stems by the fingers of the picker in the usual way. However, instead of being obliged to retain a quantity of the fruit in the palm of the hand, thus handicapping action of the fingers, the fruit as picked may be allowed to fall naturally into the hopper-like members 10 whence it is conveyed through the tubular members 11 and 16 to the receptacle or container 18. This obviates the necessity of extensive movements of the hands and arms of the operator such as are ordinarily required in transferring a handful of picked fruit to the receptacle. At the same time, the fingers of the operator are freed for more rapid picking of the fruit, due to the fact that it is not necessary to retain a quantity of fruit within the confines of the fingers and the palm of the hand, such fruit being dropped immediately into the hopper-like members.

It will therefore be understood that by use of the device of this invention the picking of fruit, such as cherries or the like, is greatly facilitated and at the same time the picked fruit is readily transferred to the receptacle or container without damage or bruising. The device of this invention is simple in construction, easily attached for use and is very durable since there are no mechanisms or working parts to get out of order.

I am aware that details of construction of devices embodying my invention may be varied through a wide range and I therefore do not purpose limiting the patent granted hereon otherwise than defined by the scope of the appended claim.

I claim as my invention:

In a device of the kind described, a hopper member comprising a cup having a large opening at the upper end thereof and a smaller opening at the bottom end, and having a wall thereof curved inwardly to conform to the contour of a human wrist and forearm, means for securing said hopper member to the arm of an operator so that the upper end thereof is in position to receive articles released from the fingers and hand, a relatively rigid conduit member in open communication with the bottom of said hopper member, means for securing said relatively rigid conduit member to the forearm of the operator, a flexible conduit member in open communication with the lower end of said relatively rigid conduit member and secured thereto, and means comprising clip-like clamps at the end of the flexible conduit member remote from the relatively rigid conduit member for securing the same to a receptacle into which articles passing from said hopper member to said conduit member may be discharged.

RUSSELL E. FAULKNER.

REFERENCES CITED

The following references are of record in the file of this patent:

UNITED STATES PATENTS

| Number | Name | Date |
| --- | --- | --- |
| 595,531 | Downey | Dec. 14, 1897 |
| 852,082 | Smith | Apr. 30, 1907 |
| 1,170,960 | Canterbury | Feb. 8, 1916 |